(12) United States Patent
Claretti et al.

(10) Patent No.: US 10,603,800 B1
(45) Date of Patent: Mar. 31, 2020

(54) GRIPPER HAVING A FOUR BAR LINKAGE

(71) Applicant: Amazon Technologies, Inc., Seattle, WA (US)

(72) Inventors: Ennio Claretti, Somerville, MA (US); Ryan Frederick Anderson, North Andover, MA (US); Gregory Coleman, Somerville, MA (US); Michael James O'Connor, Charlestown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/920,159

(22) Filed: Mar. 13, 2018

(51) Int. Cl.
```
B25J 15/02      (2006.01)
B25J 15/06      (2006.01)
B25J 15/00      (2006.01)
```

(52) U.S. Cl.
CPC ....... *B25J 15/0266* (2013.01); *B25J 15/0066* (2013.01); *B25J 15/0616* (2013.01); *Y10S 901/31* (2013.01); *Y10S 901/40* (2013.01)

(58) Field of Classification Search
CPC ................ B25J 15/0028; B25J 15/0266; B25J 15/0616; B25J 15/0066; B66C 1/422; B66C 1/48; B66C 1/585; Y10S 901/31; Y10S 901/40
See application file for complete search history.

(56) References Cited

U.S. PATENT DOCUMENTS

| | | | | |
|---|---|---|---|---|
| 3,306,646 A | * | 2/1967 | Flora, Jr. ................. | B66C 1/427 294/106 |
| 5,280,981 A | * | 1/1994 | Schulz ................... | B25J 15/103 294/106 |
| 6,039,374 A | * | 3/2000 | Klein ........................ | B66C 1/66 294/206 |
| 6,138,846 A | * | 10/2000 | Baumann ................ | B66C 1/663 212/326 |
| 7,993,094 B2 | * | 8/2011 | Tygard .................... | B66F 9/188 414/607 |
| 8,132,835 B2 | * | 3/2012 | Ban ....................... | B25J 15/0616 294/183 |

\* cited by examiner

*Primary Examiner* — Stephen A Vu
(74) *Attorney, Agent, or Firm* — BakerHostetler (57) ABSTRACT

A gripper assembly includes a four bar linkage and one or a pair of carriages the move longitudinally on rails. The linkage includes a means for maintaining the paddles in a mutually parallel orientation, which can be a link or a timing belt.

17 Claims, 10 Drawing Sheets

GRIPPER HAVING A FOUR BAR LINKAGE

BACKGROUND

The present invention is related to robotics, and more particularly to a robotic mechanism for lifting objects using a linkage.

Robotic systems for lifting objects is used in many facilities. End effectors of various types have been developed. For example, a conventional gripper of an end effector typically has a pair of opposing pads the move inwardly to engage an object. Various types of actuators and mechanical systems are used to move the pads. Also, suction cups carried by an end effector are often used for lifting objects.

Mechanisms for moving an end effector to position a gripper are well-known in the robotics industry. Controls, vision systems, sensors, and the like have been developed for a wide variety of applications.

DETAILED DESCRIPTION OF ILLUSTRATIVE EMBODIMENTS

A gripper assembly of an end effector that is adapted for mounting to an automated device, such as a robotic arm, gantry, or the like, includes a four bar linkage that enables N actions using N−1 actuators. In this regard, two actuators enable the paddles at the distal end of the linkage to open, close, and move up and down. The gripper assembly may (optionally) be connected to a suction-cup assembly or like mechanism to enhance the function of both the suction cup assembly and gripper assembly. The combination gripper assembly and suction cup can be used in a variety of applications, such as lifting objects within a tote, lifting from a tray or pod, and to or from a pallet. For (non-limiting) example, the paddles of the gripper assembly may move or position the object to enhance the capability of the suction cup to grasp the item, both the gripper and suction cup can be used simultaneously to lift heavier items than either the gripper or the suction cup could alone, and the combination provides flexibility to the shape of objects that can be lifted.

Referring to FIGS. 1 through 8 to illustrate a first embodiment 8, a gripper assembly 10 includes a pair of longitudinal, parallel rails 12a and 12b that extend between a fixed top bracket 14 and an opposing fixed bottom bracket 16. The rails and bracket form a frame on which other components are located. As illustrated in the figures, brackets 14 and 16 preferably are affixed to a body of a suction cup assembly 210, which includes a suction cup 212 at its distal end. The suction cup assembly preferably is conventional, as will be understood by persons familiar with end effector technology. Suction cup assembly 210 is optional.

A pivot carriage 20 spans between rails 12a and 12b and is mounted to the rails by linear bearings 24a and 24b such that carriage 22 slides freely on the rails 12a and 12b. Pivot carriage 20 includes a recess for receiving a threaded fitting 26, which structure is also referred to as a threaded through aperture. Carriage 20 also includes a through hole.

A second carriage 30 spans between rails 12a and 12b and is mounted to the rails by linear bearings 24a and 24b such that carriage 30 slides freely on the rails 12a and 12b. Carriage 30 is located distal to first carriage 20. Pivot carriage includes a recess for receiving a threaded fitting 26 and includes a through hole.

First and second linear actuators 40a and 40b are mounted onto the top side of top bracket 14. Actuators 40a and 40b preferably motors for driving ball screws, and the present invention encompasses linear actuators of any type. Threaded rods 44a and 44b extend downwardly from actuators 40a and 40b (respectively) through bracket 14. First linear actuator rod 44a is engaged into threaded fitting 26 of first or upper carriage 20. Second linear actuator rod 44b passes through the through hole in first carriage 20 and is engaged into threaded fitting 26 of lower or second carriage 30. Rotation of the threaded rods 44a, 44b moves the corresponding carriage 20, 30 up or down depending on the direction of rotation.

The configuration shown enables each one of the carriages 20 and 30 to be independently controlled. Driving first screw 44a in a first direction moves first carriage upwardly on rails 12a and 12b, and driving first screw 44a in an opposing direction moves first carriage downwardly on rails 12a and 12b, both without moving second carriage 30. Driving second screw 44b in a first direction moves second carriage 30 upwardly on rails 12a and 12b, and driving second screw 44b in an opposing direction moves the second carriage 30 downwardly on rails 12a and 12b, both without moving first carriage 20.

A four bar linkage assembly 50 is pivotally connected to each one of the upper carriage 20 and the lower carriage 30 and is extended and retracted by relative movement between the carriages. Linkage 50 includes a pair of upper links 52a and 52b, each of which has a distal end that is attached to upper carriage 20 at upper carriage bearings 28. A pair of lower links 54a and 54b each include a proximal end that is connected to the corresponding upper link at bearings 72a and 72b. Lower link 54b is connected to upper link 52a, and lower link 54a is connected to upper link 52b, as the lower links cross. Each lower link 54a and 54b is connected to lower carriage 30 at lower carriage bearings 38. Each one of lower links 54a and 54b extend past bearing 38, such that bearing 38 is located medially on the lower links (that is, the term "medial" refers to a point not on either end, which point is not required to be the mid-point between the ends).

A pair of paddles 56a and 56b are pivotally connected to the distal ends of lower links 54a and 54b at bearings 80a and 80b, respectively. A pair of paddle links 60a and 60b are connected between corresponding paddles 56a and 56b and corresponding upper links 52a and 52b. Paddle link 60a has a distal end connected to paddle 56a and a proximal end connected to upper link 52b at a bearing 78b. Paddle link 60b has a distal end connected to paddle 56b and a proximal end connected to upper link 52a at bearing 78a. Bearings 78a and 78b preferably are at distal ends of upper links 52a and 52b, such that the connection between lower links 54a and 54b to upper links 52a and 52b occurs at a medial point on upper links 52a and 52b.

In operation, first actuator may rotate first screw 44a to drive upper carriage 20 down toward second carriage 30 to move upper linkage pivot 28 down toward lower linkage pivot 38, which movement contracts or retracts linkage 50 and moves the distal ends of lower links 54a and 54b and paddles 56a and 56b mutually apart. Paddle links 60a and 60 cause the paddles 56a and 56b to pivot relative to lower links 54a and 54b, and pivots 80a and 80b are positioned below pivots 76a and 76b to maintain paddles 56a and 56b in a mutually parallel relationship. When the end effector holds assembly 10 in a vertical orientation, paddles 56a and 56b preferably are vertical. In this regard, the term vertical is used herein to refer to approximately vertical orientation to the extent to permit paddles 56a and 56b to grasp items having vertical sides, such as a paperboard box. Perfect verticality is not required.

Upon the gripper assembly 10 being positioned relative to an object to be lifted, both screws 44a and 44b may be actuated to move the entire linkage 50 up or down relative to the rails 12a and 12b. When desired, the upper carriage 20 may be moved upwardly relative to lower carriage 30 to extend or elongate link 50 to move paddles 56a and 56b inwardly while paddle links 60a and 60b maintain the mutually parallel (preferably vertical) orientation of the paddles. The fully closed position of paddles is illustrated in the figures showing second embodiment assembly 10, such as in FIG. 12. Conventional sensors in the paddles, vision systems, and the like may be employed depending on the particular parameters of the application, as will be understood by persons familiar with gripper technology.

Alternatively, carriage 30 may be a brace that is fixed to rails 12a and 12b, and thus not moveable. In the alternative embodiment, only one actuator is required to move upper carriage 20 such that link 50 has the full open and closing function.

Referring to FIGS. 9 through 16 to illustrate a second embodiment 108, a gripper assembly 110 includes a pair of longitudinal, parallel rails 112a and 112b that extend between a fixed top bracket 114 and an opposing fixed bottom bracket 116. The rails and bracket form a frame on which other components are located. As illustrated in the figures, brackets 114 and 116 preferably are affixed to a body of a suction cup assembly 210, which includes a suction cup 212 at its distal end, as described with first embodiment 8. Suction cup assembly 210 is optional.

A pivot carriage 120 spans between rails 112a and 112b and is mounted to the rails by linear bearings 124a and 124b such that carriage 122 slides freely on the rails 112a and 112b. Pivot carriage includes a recess for receiving a threaded fitting 26 and a through hole.

A second carriage 130 spans between rails 112a and 112b and is mounted to the rails by linear bearings 124a and 124b such that carriage 130 slides freely on the rails 112a and 12b. Carriage 130 is located distal to first carriage 120. Pivot carriage includes a recess for receiving a threaded fitting 126 and includes a through hole. Preferably, carriages 120 and 130 are as described for carriages 20 and 30 of first embodiment 8.

Figure 1:
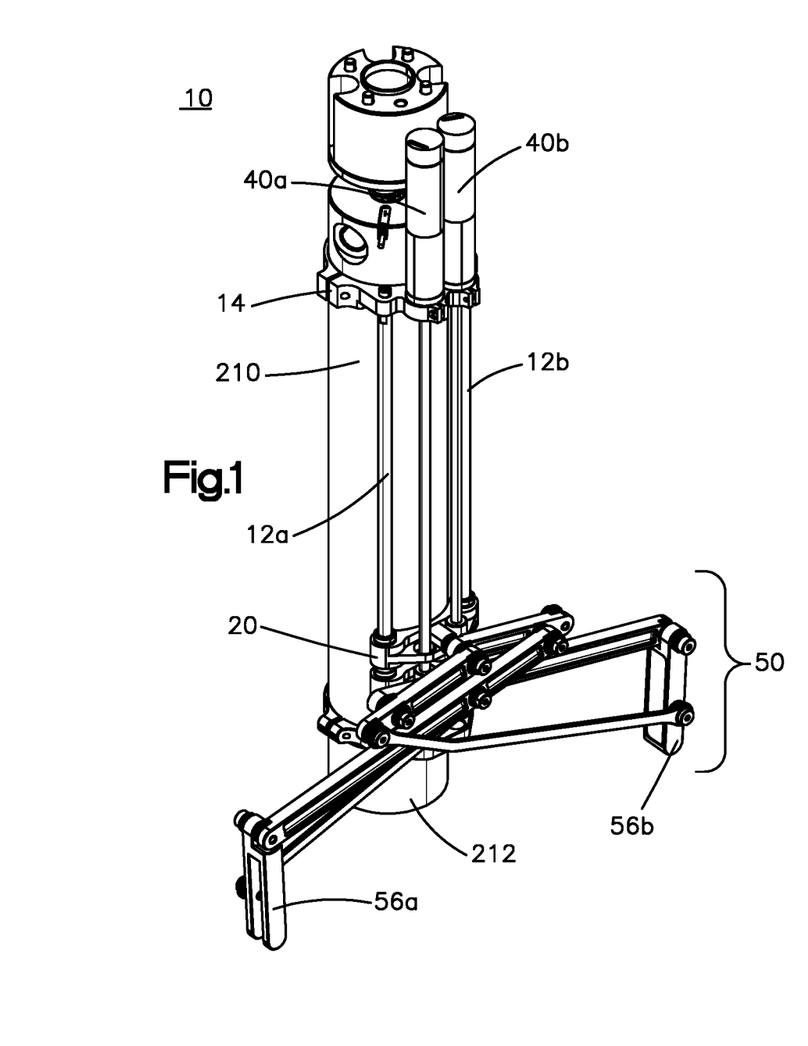
FIG. 1 is a top perspective view of a first embodiment mechanism combining a gripper assembly and a suction cup assembly, illustrating a four bar linkage gripper assembly in a retracted position such that the paddles are spaced apart.
Figure 2:
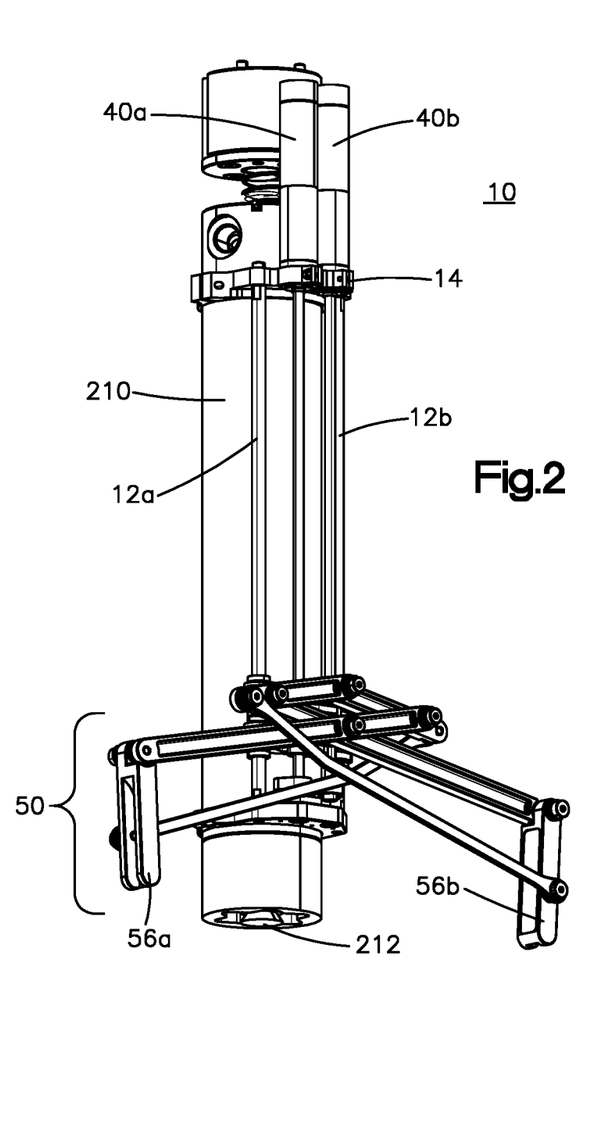
FIG. 2 is another perspective view of the mechanism of FIG. 1.
Figure 3:
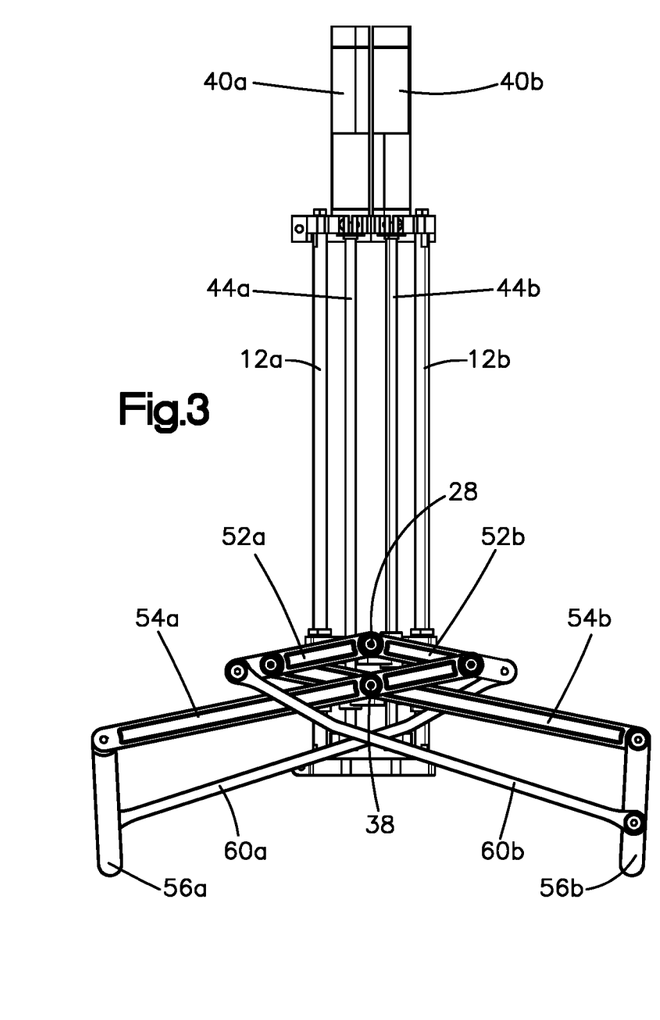
FIG. 3 is a side view of the mechanism of FIG. 1.
Figure 4:
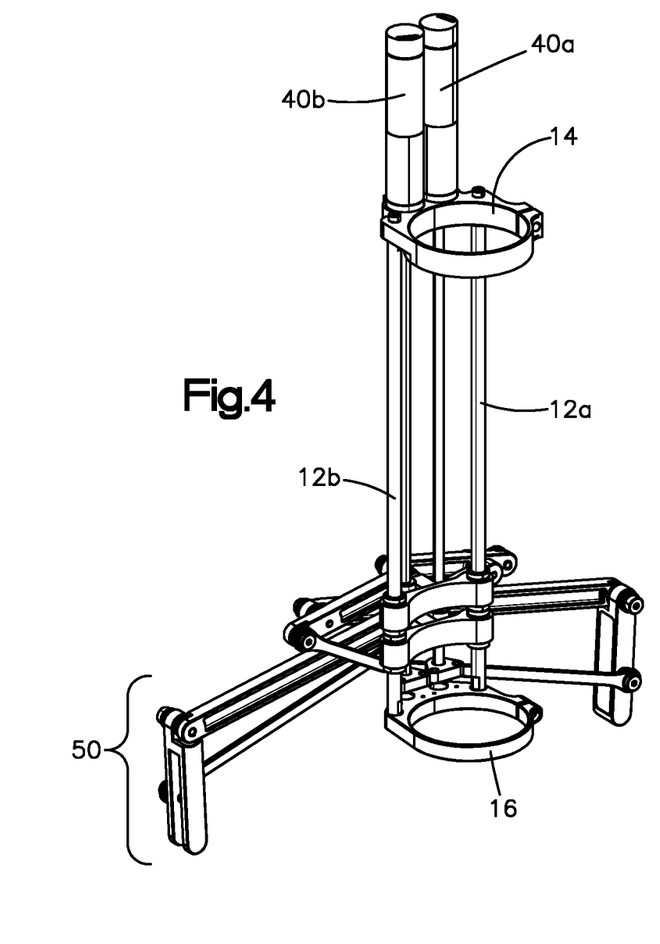
FIG. 4 is a perspective view of the gripper assembly of FIG. 1 with the suction cup assembly removed for clarity.
Figures 5, 6:
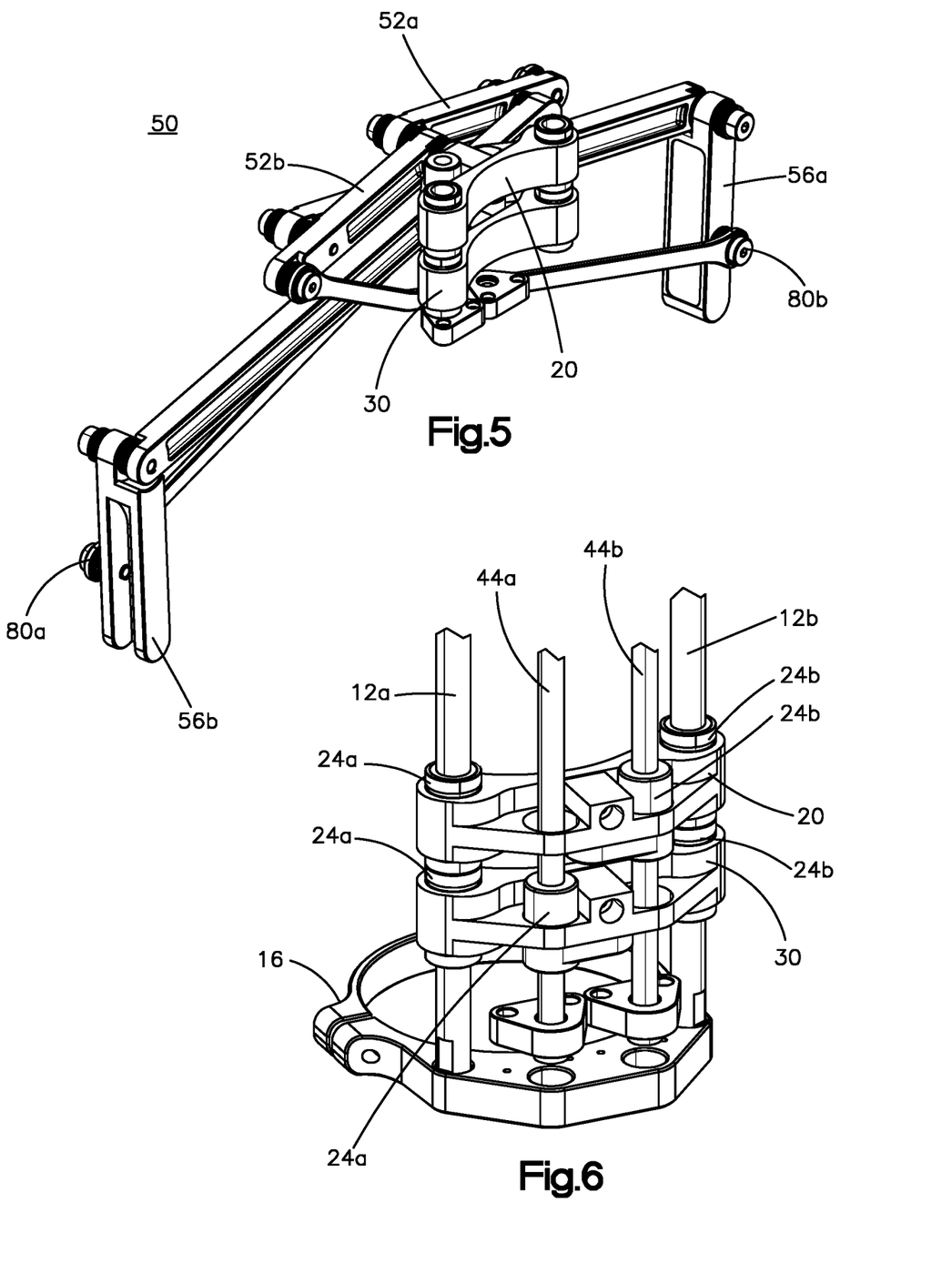
FIG. 5 is a perspective view of the gripper assembly of FIG. 4 with portions removed to illustrate the four bar linkage and carriages.
FIG. 6 is an enlarged perspective view of a lower portion of gripper assembly, with the four bar linkage removed for clarity.
Figure 7:
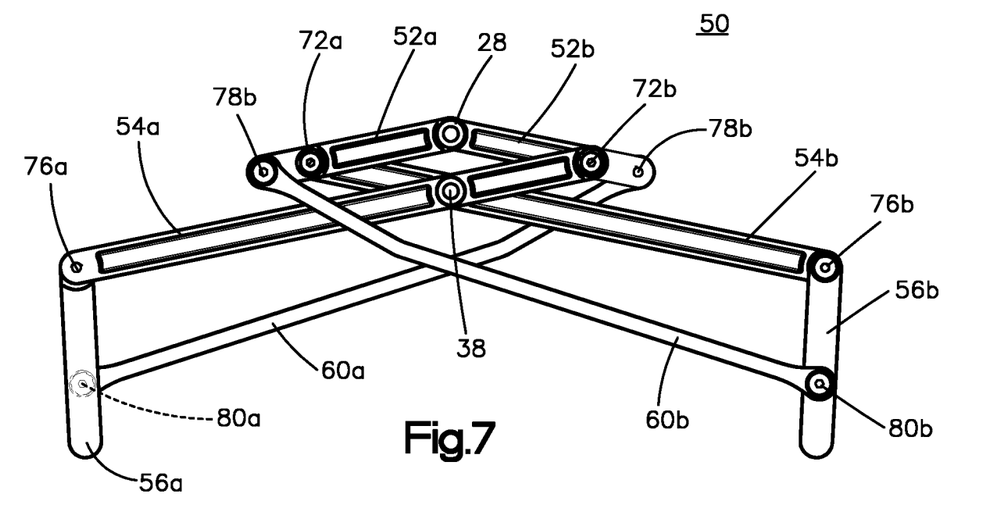
FIG. 7 is a side view of the four bar linkage assembly.
Figure 8:
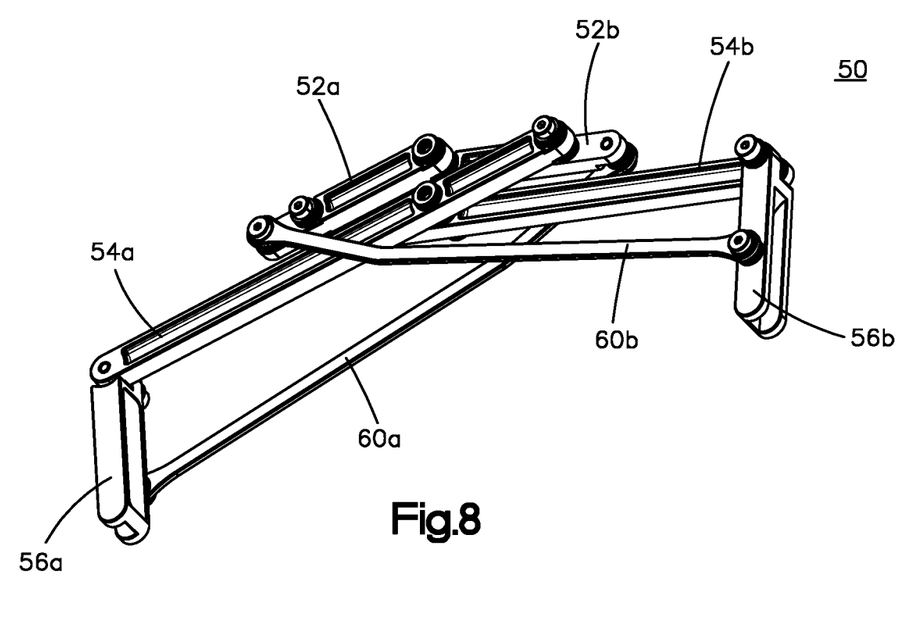
FIG. 8 is a perspective view of the four bar linkage assembly.
Figure 9:
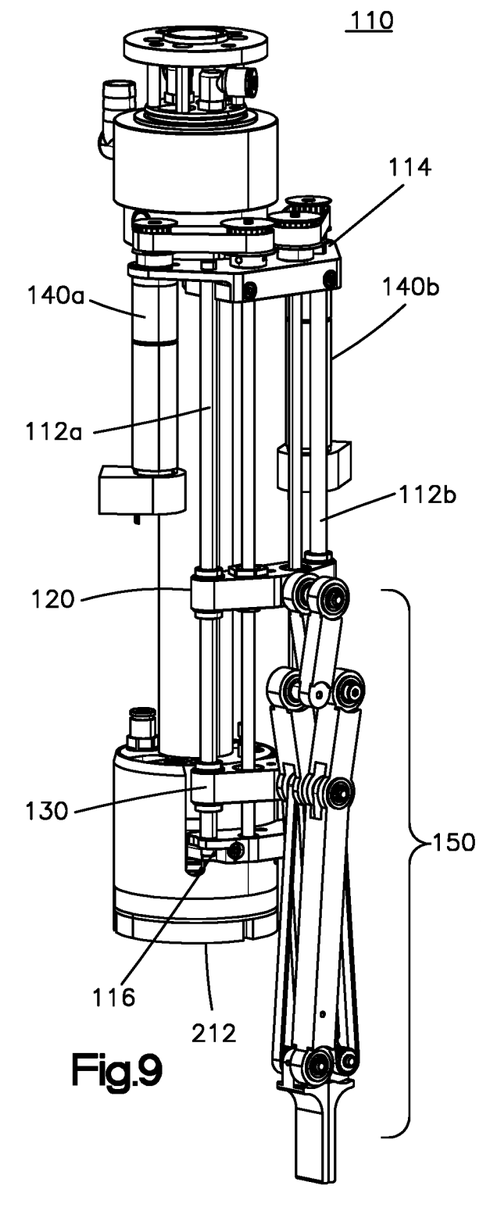
FIG. 9 is a perspective view of a second embodiment mechanism combining a gripper assembly and a suction cup assembly, illustrating a four bar linkage gripper assembly in a extended position such that the paddles are in mutual contact apart.
Figure 10:
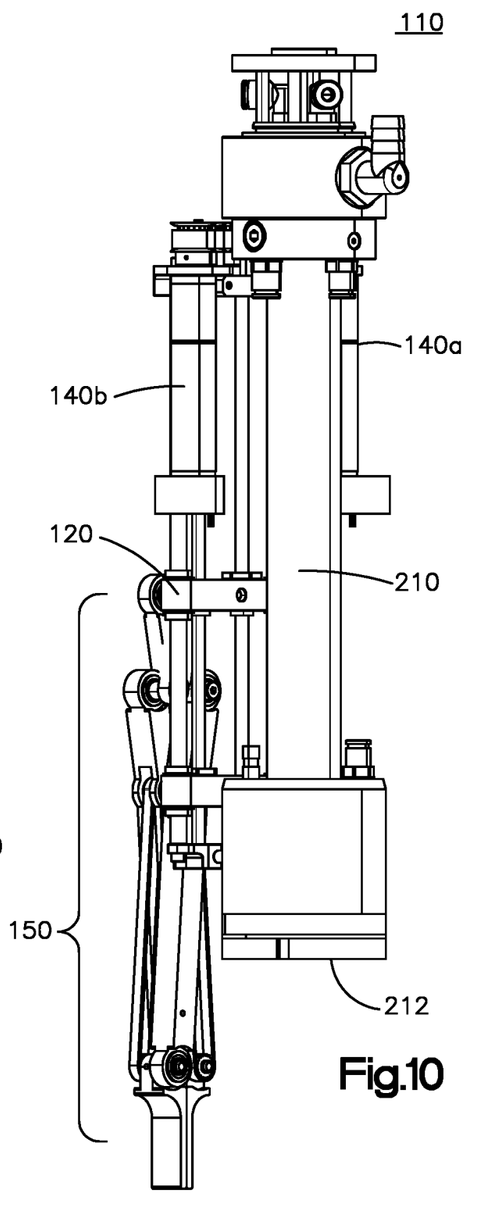
FIG. 10 is another perspective view of the mechanism of FIG. 9.
Figure 11:
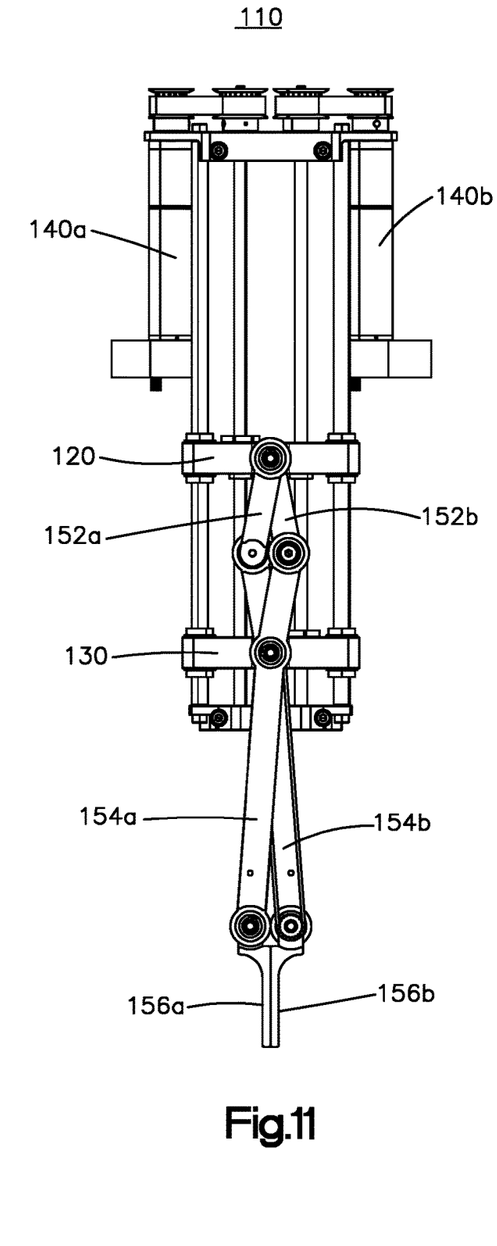
FIG. 11 is a side view of the mechanism of FIG. 9.
Figure 12:
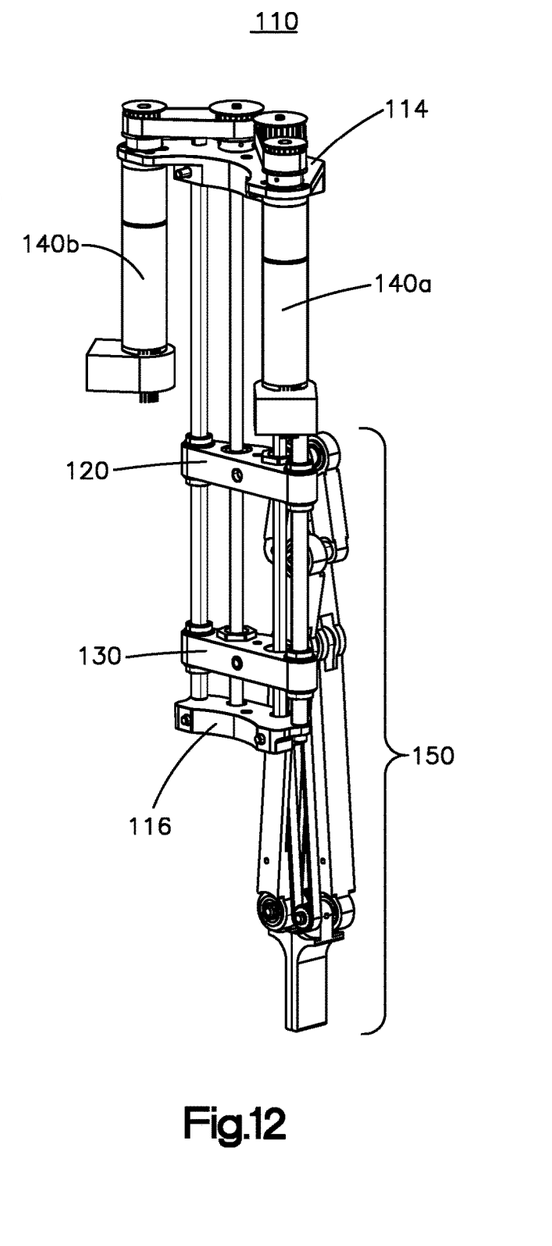
FIG. 12 is a perspective view of the mechanism of FIG. 9, with the suction cup assembly removed for clarity.
Figure 13:
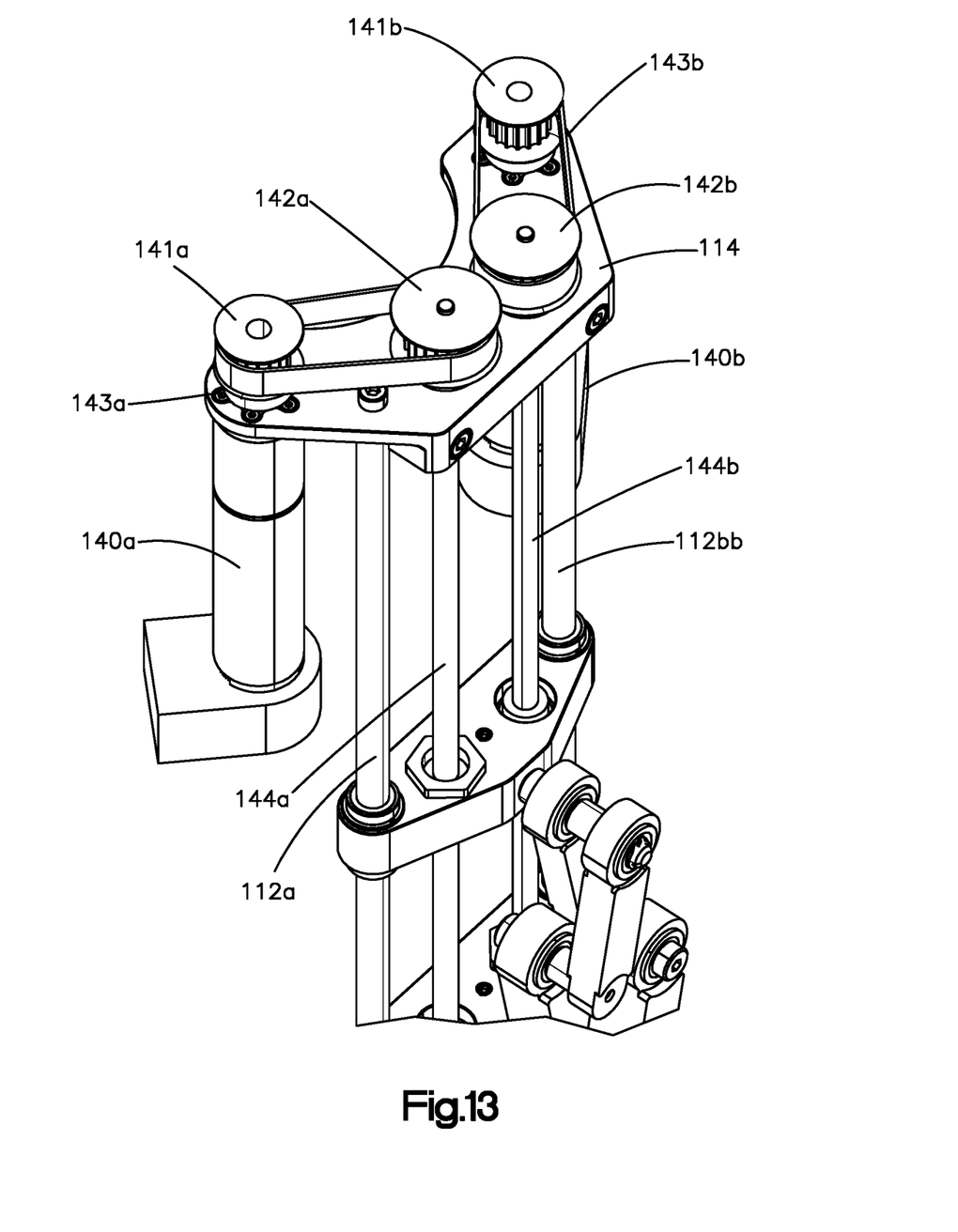
FIG. 13 an enlarged view of a top portion of the structure of FIG. 12.
Figure 14:
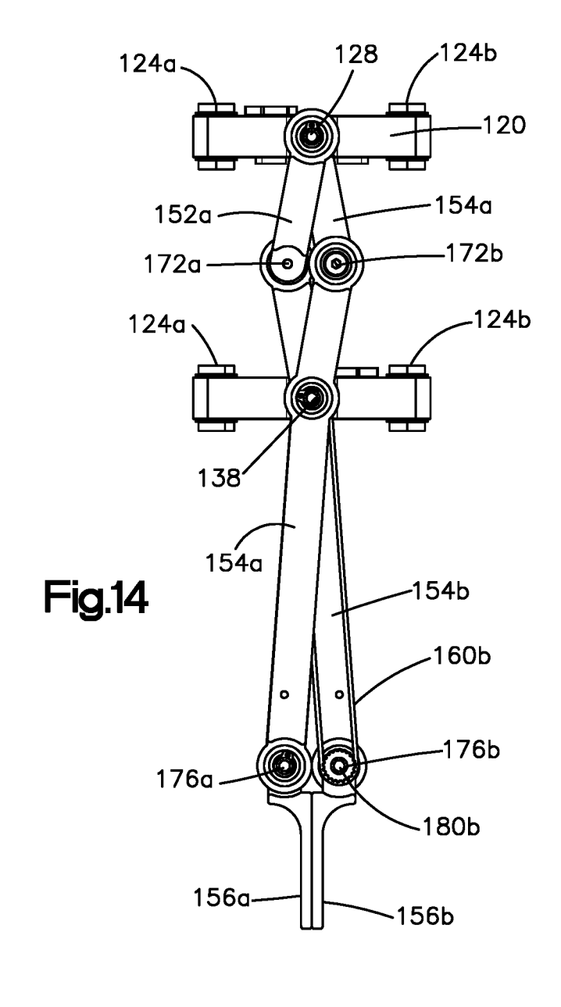
FIG. 14 is a side view of the four bar linkage.
Figure 15:
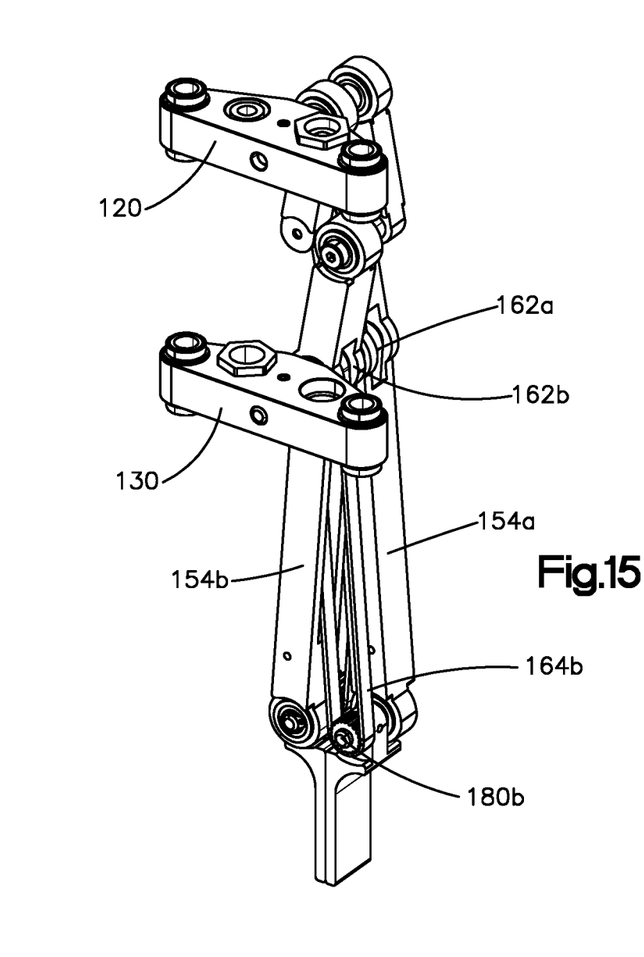
FIG. 15 is a perspective view of the four bar linkage.
Figure 16:
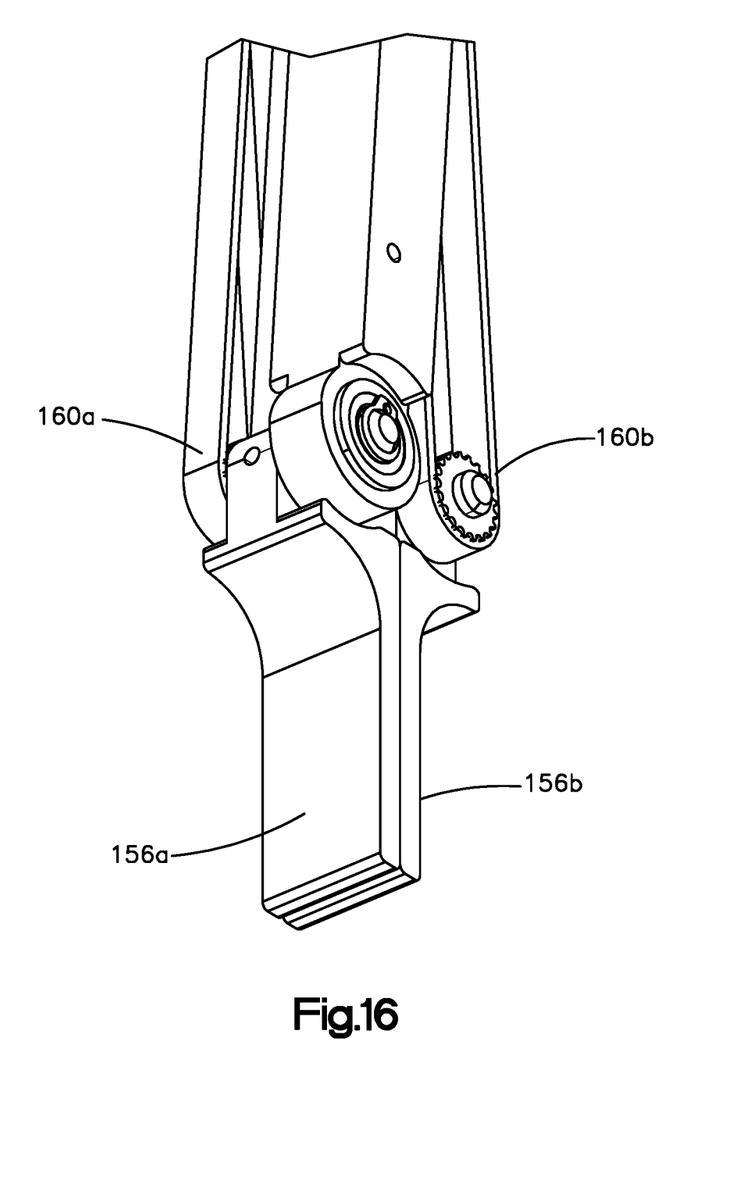
FIG. 16 is an enlarged view perspective view of the lower portion of the four bar linkage.

First and second actuators 140a and 140b are mounted onto top bracket 114. As best illustrated in FIGS. 11 and 12, actuators 140a and 140b are motors that are mounted to an underside of top bracket 114 and include pulleys 141a and 141b mounted to the output shafts of the motors. As illustrated in FIG. 13, a pair of thread rods or screws 144a and 144b extend downwardly through top bracket 114. Each threaded rod 114a, 144b includes a pulleys 142a and 142b that is drive by motor pulley 141a and 141b by a timing belt 143a and 143b.

The capabilities of the carriages in second embodiment 108 are the same as those described for first embodiment 8.

A four bar linkage assembly 150 is pivotally connected to each one of the upper carriage 120 and the lower carriage 130 and is extended and retracted by relative movement between the carriages. Linkage 150 includes a pair of upper links 152a and 152b, each of which has a distal end that is attached to upper carriage 120 at upper carriage bearings 128. A pair of lower links 154a and 154b each include a proximal end that is connected to the corresponding upper link at bearings 172a and 172b. Lower link 154b is connected to upper link 152a, and lower link 154a is connected to upper link 152b, as the lower links cross. Each lower link 154a and 154b is connected to lower carriage 130 at lower carriage bearings 138. Each one of lower links 154a and 154b extend past bearing 138, such that bearing 138 is located medially on the lower links.

Figure 17:
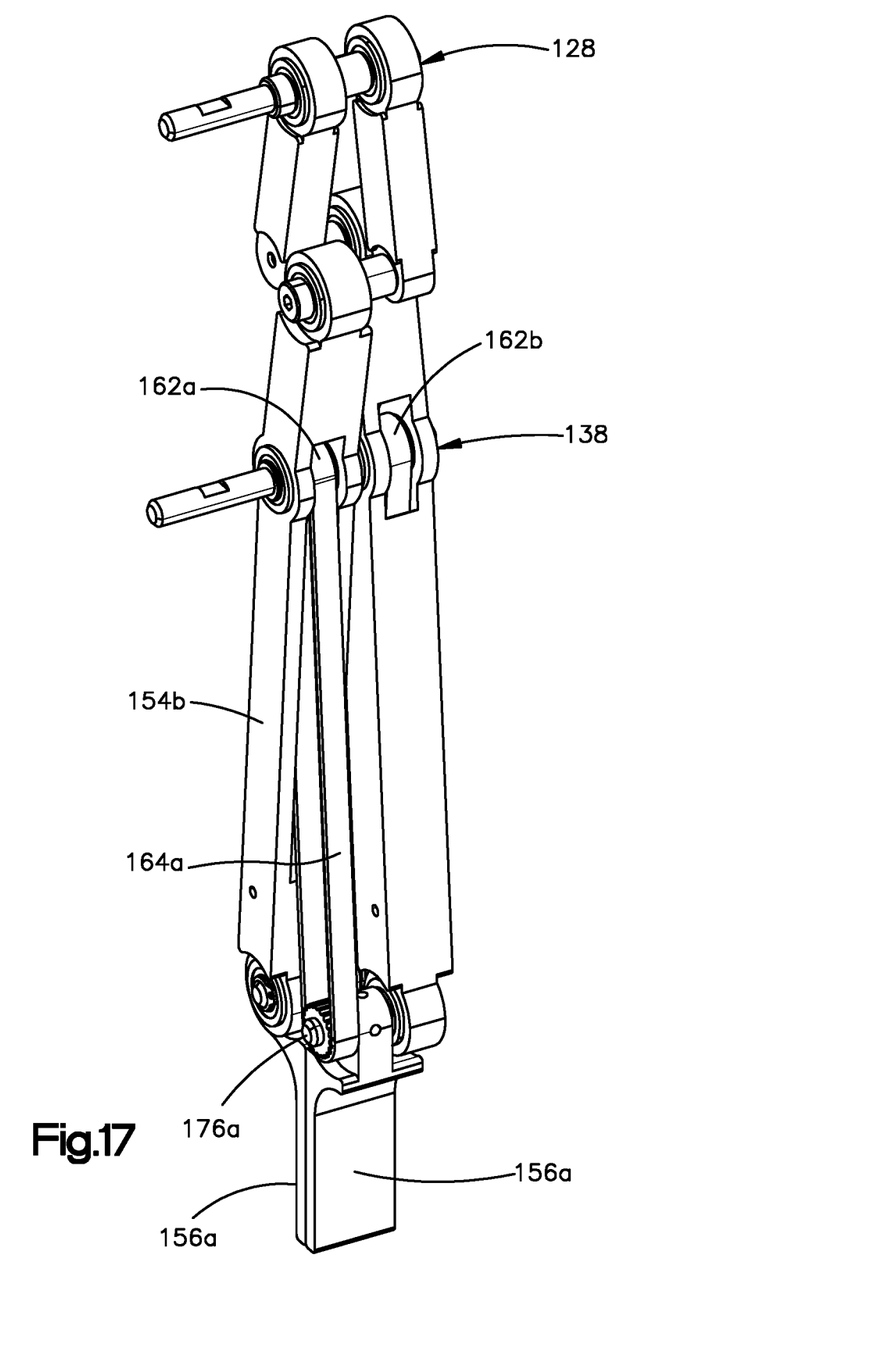
FIG. 17 is an enlarged view of a portion of the linkage, illustrating the timing belt.

A pair of paddles 156a and 156b is pivotally connected to the distal ends of lower links 154a and 154b at bearings 180a and 180b, respectively. A pair of timing belt assemblies 160a and 160b maintain the mutually parallel alignment of paddles 156a and 156b. Belt assemblies 160a and 160b include a timing belt 164a and 164b, lower pulleys 176a and 176b attached to paddles 156a and 156b, and upper pulleys 162a and 162b attached at pivot 138 (FIG. 17).

In operation, first actuator may rotate first screw 144a to drive upper carriage 120 down toward second carriage 130, which moves upper linkage pivot 128 down toward lower linkage pivot 138. Linkage 150 contracts or retracts and moves the distal ends of lower links 154a and 154b and paddles 56a and 156b apart. Belt assemblies 160a and 160b cause the paddles 156a and 156b to pivot relative to lower links 154a and 154b and maintain paddles 156a and 156b in a mutually parallel relationship. When the end effector holds assembly 110 vertically, paddles 156a and 156b preferably are vertical.

Upon the assembly 110 being positioned relative to an object to be lifted, both screws 144a and 144b may be actuated to move the entire linkage 150 up or down relative to the rails 112a and 112b. When desired, the upper carriage 120 may be moved upwardly relative to lower carriage 30 to extend or elongate link 50 to move paddles 56a and 56b inwardly while belt assemblies 160a and 160b maintain the mutually parallel (preferably vertical) orientation of the paddles. FIGS. 1-8 illustrate the paddles in their fully open configuration. Conventional sensors in the paddles, vision systems, and the like may be employed depending on the particular parameters of the application, as will be understood by persons familiar with gripper technology.

Alternatively, carriage 130 may be a brace that is fixed to rails 112*a* and 112*b*, and thus not moveable. In the alternative embodiment, only one actuator is required to move upper carriage 120 such that link 150 had the full open and closing function but the link 50 cannot move up and down the rails.

In either embodiment of gripper assembly 10 or 110, the gripper assembly may be retracted by drawing both carriages 20 and 30, or 120 and 130, upwardly and spacing the carriages apart to their maximum extent. In the fully retracted position, assembly 10 or 110 does not impeded the operation of suction cup assembly 210. Further, the figures illustrate the paddles as either spaced apart to a maximum extent to in mutual contact. It is understood that the paddles may have any position between the two extremes, as required to engage objects of various sizes. For example, the structure disclosed herein may function for grasping any items, including for non-limiting example a corrugate box, bubble mailer, bags, loose products, and the like. As illustrated in FIGS. 11 and 12, the paddles can be configured to pinch together, as helpful for grasping bags and like packages. The force applied by the paddles may be chosen or predetermined according to the parameters of particular application, and the force may be controlled by the motor torque, as will be understood by persons familiar with control of robotic devices.

The device that moves the end effector referred to herein can be of any type, such as, a robotic arm, a gantry, or any other structure. Preferably, actuators 40*a* and 40*b*, or 140*a* or 140*b*, include encoders to provide control of the rotation of the corresponding threaded rods. Further, the control system may base its decisions on information about the object already known to the control system, according to conventional principles that will be understood by persons familiar with automated lifting of objects, such as in a fulfillment center.

The particular embodiments disclosed are used to illustrate aspects of the present invention. It is not intended that the present invention be limited to the particular structure and/or function of the embodiments. Rather, it is intended that structure and function of any one of the embodiments can be shared with other ones of the embodiments disclosed. Further, it is intended that the scope of the claims be the measure of the invention, as the disclosed structure and function are intended merely to be specific examples of the general principles, as claimed.

What is claimed is:

1. A gripper of an end effector, the gripper comprising
   a pair of outboard rails;
   a pivot carriage spanning the rails and slidable on the rails;
   an actuator adapted for moving the pivot carriage up and down on the rails; and
   a four bar linkage assembly having:
      a first connection on the pivot carriage and movable with the pivot carriage;
      a second, connection that is fixed relative to the rails such that the second connection is not movable with the pivot carriage, and
      a pair of opposing paddles mounted to arms of the four bar linkage assembly, the paddles being adapted for maintaining a parallel orientation while the four bar linkage assembly opens and closes in response to movement of the pivot carriage.

2. A gripper assembly of an end effector, the gripper assembly comprising:
   a pair of longitudinal rails, each one of the rails being affixed to a fixed upper bracket at an upper end thereof and being affixed to a fixed lower bracket at a lower end thereof;
   a pivot carriage spanning the rails and slideable on the rails;
   a linear actuator adapted for moving the pivot carriage up and down on the rails;
   a brace spanning the rails and distal to the pivot carriage; and
   a four bar linkage assembly including:
      a pair of upper links, each upper link having a proximal pivotal connection to the pivot carriage;
      a pair of lower links, each lower link having a pivot connection to a corresponding one of the upper links;
      a pair of paddles, each one of the paddles being connected to the corresponding lower link; and
      a pair of paddle orientation mechanisms, each one of the paddle orientation mechanism connected between the corresponding upper link and the corresponding paddle, the paddle orientation mechanism being adapted for maintaining mutually parallel orientation of the paddles.

3. The gripper assembly of claim 2 wherein the brace is affixed to the rails and immovable relative to the lower bracket.

4. The gripper assembly of claim 2 wherein in the linear actuator is a ball screw having a shaft that extends through a threaded connection on the pivot carriage.

5. The gripper assembly of claim 2 wherein the liner actuator is a first linear actuator and the brace is slideable on the rails, and wherein the gripper assembly further comprises a second linear actuator that is adapted for moving the brace up and down the rails.

6. The gripper assembly of claim 5 wherein in the first linear actuator is a ball screw having a shaft that extends through a threaded connection on the pivot carriage, and the second linear actuator is a ball screw that extends through a threaded connection on the brace.

7. The gripper assembly of claim 2 wherein the pivot connection between each one of the upper link and the lower link is at a medial point of the lower link, and each one of the paddles is connected to the corresponding lower link at a distal end of the lower link.

8. The gripper assembly of claim 2 wherein the paddle orientation mechanism is a pair of paddle links.

9. The gripper assembly of claim 2 wherein the paddle orientation mechanism is a pair timing belts, each one of the upper links and the paddle having a sprocket for engaging the timing belt.

10. A combination gripper and suction cup assembly comprising:
    the gripper assembly of claim 2; and
    a suction cup assembly having a body and a suction cup at a distal end thereof, the gripper assembly being mounted on the suction cup assembly body.

11. The combination of claim 10 wherein the gripper assembly adapted to be retractable relative to the suction cup assembly.

12. A method of lifting an object comprising the steps of:
    (a) positioning a gripper assembly into a lifting position relative to the object;

(b) sliding a pivot carriage on a pair of longitudinal rails away from a brace such that a four bar linkage pivotally connected to each one of the pivot carriage and the brace extends;

(c) in response to the extending in the sliding step (b), engaging the object by paddles on opposing distal ends of the four bar linkage;

(d) after the engaging step (c), lifting and moving the object; and (e) after the lifting and moving step (d), sliding the pivot carriage toward the brace such that the four bar linkage contracts, thereby disengaging the object from the paddles.

13. The method of claim 12 further comprising the step of sliding the brace with the pivot carriage to move the paddles relative to the rails.

14. The method of claim 12 further comprising the step of maintaining mutually parallel orientation of the paddles during the each one of the steps (a) through (e).

15. The method of claim 14 wherein the maintaining step includes engaging the paddles with paddle links that are engaged with the four bar linkage.

16. The method of claim 14 wherein the maintaining step includes engaging the paddles with timing belts that are engaged with the four bar linkage.

17. The method of claim 14 further comprising the step of engaging a suction cup mechanism to contact the object during the lifting and moving step (e).

\* \* \* \* \*